United States Patent
Li

(10) Patent No.: US 10,602,343 B2
(45) Date of Patent: Mar. 24, 2020

(54) IMS PARAMETER CONFIGURATION METHOD, SYSTEM AND MOBILE TERMINAL

(71) Applicant: TCL Communication (Ningbo) Co., Ltd., Ningbo (CN)

(72) Inventor: Tao Li, Ningbo (CN)

(73) Assignee: TCL COMMUNICATION (NINGBO) CO., LTD., Ningbo (CN)

(*) Notice: Subject to any disclaimer, the term of this patent is extended or adjusted under 35 U.S.C. 154(b) by 0 days.

(21) Appl. No.: 16/606,135

(22) PCT Filed: Apr. 19, 2018

(86) PCT No.: PCT/CN2018/083793
§ 371 (c)(1),
(2) Date: Oct. 17, 2019

(87) PCT Pub. No.: WO2018/192554
PCT Pub. Date: Oct. 25, 2018

(65) Prior Publication Data
US 2020/0053549 A1 Feb. 13, 2020

(30) Foreign Application Priority Data
Apr. 20, 2017 (CN) .......................... 2017 1 0262706

(51) Int. Cl.
*H04W 8/18* (2009.01)
*H04L 29/06* (2006.01)
(Continued)

(52) U.S. Cl.
CPC ......... *H04W 8/183* (2013.01); *H04L 65/1016* (2013.01); *H04M 1/725* (2013.01);
(Continued)

(58) Field of Classification Search
CPC ....... H04W 8/183; H04W 8/18; H04W 60/04; H04W 12/00405; H04W 8/00;
(Continued)

(56) References Cited

U.S. PATENT DOCUMENTS 10,531,358 B2 *   1/2020  Reddy et al. ......... H04W 40/20
2008/0020704 A1 * 1/2008  Costa et al. ................. 455/3.06
(Continued)

FOREIGN PATENT DOCUMENTS

| CN | 101212386 A | 7/2008 |
| CN | 105916131 A | 8/2016 |
| CN | 107087070 A | 8/2017 |

*Primary Examiner* — Meless N Zewdu
(74) *Attorney, Agent, or Firm* — Kirton McConkie; Evan R. Witt

(57) ABSTRACT

An international mobile subscriber (IMS) parameter configuration method, comprising: an application processor in a mobile terminal acquires an IMS identification code; from a baseband processor by means of a preset command; the application processor in the mobile terminal collects IMS configuration parameters and associates a mobile country code and a mobile network code in the IMS identification code with the IMS configuration parameters; the application processor in the mobile terminal transmits the mobile country code, the mobile network code and the IMS configuration parameters to the baseband processor; and the baseband processor in the mobile terminal receives the IMS configuration parameters from the application processor and configures the IMS configuration parameters of a corresponding service provider according to the mobile country code and the mobile network code.

13 Claims, 2 Drawing Sheets

(51) Int. Cl.
  *H04M 1/725* (2006.01)
  *H04W 60/04* (2009.01)
  *H04W 88/02* (2009.01)

(52) U.S. Cl.
  CPC .............. *H04W 8/18* (2013.01); *H04W 60/04* (2013.01); *H04W 88/02* (2013.01)

(58) Field of Classification Search
  CPC ....... H04W 8/08; H04W 80/00; H04W 80/02; H04W 80/04; H04W 80/06; H04W 80/12; H04W 60/00; H04W 64/04; H04W 76/00; H04W 76/15; H04W 76/16; H04W 24/00; H04W 24/02; H04W 24/04; H04W 4/06; H04W 29/06; H04W 88/00; H04W 88/02; H04W 88/06; H04W 88/18; H04W 88/08; H04W 92/00; H04W 92/02; H04W 92/04; H04W 36/00; H04W 36/125; H04W 36/20; H04W 36/28; H04W 36/00837; H04W 36/0083; H04W 36/0066; H04W 36/0011; H04W 36/0033; H04M 1/725; H04M 1/72519; H04M 1/72522; H04L 65/1016; H04L 29/06217; H04L 29/08081; H04L 29/06176; H04L 51/10; H04L 61/3095; H04L 29/06027; H04L 41/0803; H04L 41/0823; H04L 41/0853; H04L 67/34; H04L 25/00; H04L 29/0602

See application file for complete search history.

(56) References Cited

U.S. PATENT DOCUMENTS

| | | | |
|---|---|---|---|
| 2014/0038596 A1* | 2/2014 | Costa et al. | H04W 8/06 |
| 2014/0301258 A1* | 10/2014 | Belghoul | H04W 52/0209 |
| 2016/0226922 A1 | 8/2016 | Russell et al. | |
| 2016/0295544 A1 | 10/2016 | Jiang et al. | |
| 2018/0049086 A1* | 2/2018 | Bouvet et al. | H04W 36/08 |
| 2018/0359628 A1* | 12/2018 | Breuer et al. | H04W 8/183 |
| 2019/0380024 A1* | 12/2019 | Gu et al. | H04W 28/24 |

\* cited by examiner

IMS PARAMETER CONFIGURATION METHOD, SYSTEM AND MOBILE TERMINAL

CROSS REFERENCE

This application is a National Stage of International Application No. PCT/CN2018/083793, filed on Apr. 19, 2018, which claims the priority of Chinese Patent Application No. 201710262706.9, entitled "METHOD FOR CONFIGURING IMS PARAMETERS, SYSTEM AND MOBILE TERMINAL," filed on Apr. 20, 2017, the disclosure of which is incorporated herein by reference in its entirety.

FIELD OF THE INVENTION

The present disclosure relates to the field of mobile terminal, more particularly, to a method for configuring IP multimedia subsystem (IMS) parameters, a system and a mobile terminal.

BACKGROUND

In a mobile terminal, there are generally two processors. One of them is an application processor (AP), which is mainly used for processing Android applications. The other one is a baseband processor (BP), which is mainly used for processing communications with base stations.

At present, owing to the popularity of VoLTE/VoWiFi functions, the IMS support required by them is basically a function that mobile terminals must support in the future. Almost all operators now require the terminal to support the IMS protocol so as to meet the demand for the terminal to support VoLTE/VoWiFi.

Due to the differences among networks, and the fact that the specification does not impose requirements on many configurations of the IMS, how to implement the terminal IMS configuration to be complied with the network end has become a very labor-intensive process when a mobile terminal manufacturer ships a single product to multiple operators.

For a mobile phone, the current platform vendors' scheme for implementation of IMS configuration is generally:

Presetting IMS configuration of a known operator at a BP end is as follows. When a SIM card is inserted into the mobile phone, according to a mobile country code (MCC) and a mobile network code (MNC) comprised in an international mobile subscriber identity (IMSI, the IMSI is a sign that distinguishes a mobile subscriber and is stored in the SIM card, it can be used to distinguish effective information of the mobile subscriber) in the SIM card, the IMS parameter number of the operator in its respective country is mapped. For example, the IMS parameter number of China Mobile is 1. Then, the AP end transmits the IMS parameter number to the BP. The BP acquires IMS parameter tables correspondingly according to the IMS parameter number. When the mobile phone is interacted with a network end, these IMS parameter tables that have been mapped to the network end are used.

For example, POP-X products of a T manufacturer need to be shipped to Orange, France and Vodafone, Germany at the same time, then the T manufacturer is required to preset IMS configurations for Orange, France and Vodafone, Germany at the BP of the mobile phone. In this manner, the demands for IMS by Orange, France and Vodafone, Germany can be met.

Under the circumstances, there will be a situation in which an operator corresponding to the MCC and MNC starts an IMS related network. For the terminal, it is necessary to access the IMS network to test and communicate with the operator so as to acquire related parameters, and then preset the related parameters at the BP end. The BP end is thus able to implement capabilities used under the network. Since codes at the BP end are generally written in C language, each parameter change requires processes including code modification, compilation and being downloaded to the mobile phone to run, which is very time consuming and labor-intensive.

SUMMARY

The present disclosure provides a method for configuring IMS parameters, a system and a mobile terminal so that IMS parameters of the baseband processor are configured through the application processor. When the IMS configuration needs to be updated, there is no need to recompile the code page or wait for the software developer to compile the new version. The parameter configuration is directly modified at the application processor to complete the verification test. The efficiency is improved, and the costs of certification, drive test, and project maintenance of the mobile phone manufacturer are reduced.

A first aspect of the present disclosure provides a method for configuring IMS parameters. The method comprises:

an application processor in a mobile terminal acquiring an international mobile subscriber identity from a baseband processor through a preset command;

the application processor in the mobile terminal collecting IMS configuration parameters, and associating a mobile country code and a mobile network code in the international mobile subscriber identity with the IMS configuration parameters;

the application processor in the mobile terminal sending the mobile country code, the mobile network code and the IMS configuration parameters to the baseband processor; and the baseband processor in the mobile terminal receiving the IMS configuration parameters from the application processor, and setting the IMS configuration parameters corresponding to an operator according to the mobile country code and the mobile network code.

Optionally, the preset command is an AT+CIMI command, the international mobile subscriber identity comprises the mobile country code and the mobile network code.

Optionally, the step of acquiring the international mobile subscriber identity from the baseband processor through the preset command by the application processor in the mobile terminal comprises:

the baseband processor in the mobile terminal reading the international mobile subscriber identity in a SIM card through a modem in advance; and the application processor in the mobile terminal acquiring the mobile country code and the mobile network code in the international mobile subscriber identity through the AT+CIMI command.

Optionally, the step of collecting the IMS configuration parameters, and associating the mobile country code and the mobile network code in the international mobile subscriber identity with the IMS configuration parameters by the application processor in the mobile terminal comprises:

collecting the IMS configuration parameters correspondingly through an MTK platform according to a request of the operator; and associating the mobile country code and the mobile network code in the international mobile subscriber identity of the SIM card with the IMS configuration parameters according to a request of the operator, so that the baseband processor identifies the IMS configuration parameters of the operator.

Optionally, the method further comprises: directly modifying the IMS configuration parameters at the application processor to complete a verification test and perform an update when an IMS configuration of the mobile terminal needs to be updated.

A second aspect of the present disclosure provides an IMS parameter configuration system. The IMS parameter configuration system comprises a processor and a memory communicatively connected to the processor. The memory stores a computer program, and the computer program is configured to be executed by the processor. The computer program comprises:

an acquisition module configured to cause an application processor in a mobile terminal to acquire an international mobile subscriber identity from a baseband processor through a preset command;

a collection and association module configured to cause the application processor in the mobile terminal to collect IMS configuration parameters, and associate a mobile country code and a mobile network code in the international mobile subscriber identity with the IMS configuration parameters;

a sending module configured to cause the application processor in the mobile terminal to send the mobile country code, the mobile network code and the IMS configuration parameters to the baseband processor; and a receiving and setting module configured to cause the baseband processor in the mobile terminal to receive the IMS configuration parameters from the application processor, and set the IMS configuration parameters corresponding to an operator according to the mobile country code and the mobile network code.

Optionally, the preset command is an AT+CIMI command, the international mobile subscriber identity comprises the mobile country code and the mobile network code.

Optionally, the acquisition module comprises:

a reading unit configured to cause the baseband processor in the mobile terminal to read the international mobile subscriber identity in a SIM card through a modem in advance; and a command acquisition unit configured to cause the application processor in the mobile terminal to acquire the mobile country code and the mobile network code in the international mobile subscriber identity through an AT+CIMI command.

Optionally, the collection and association module comprises:

a collection unit configured to cause the IMS configuration parameters to be collected correspondingly through an MTK platform according to a request of the operator; and an association unit configured to cause the mobile country code and the mobile network code in the international mobile subscriber identity of the SIM card to be associated with the IMS configuration parameters according to a request of the operator, so that the baseband processor identifies the IMS configuration parameters of the operator.

Optionally, the system further comprises: directly modifying the IMS configuration parameters at the application processor to complete a verification test and perform an update when an IMS configuration of the mobile terminal needs to be updated.

A third aspect of the present disclosure provides a mobile terminal. The mobile terminal comprises a processor and a memory communicatively connected to the processor.

The memory is configured to store instructions and data.

The processor is configured to execute an application processor in a mobile terminal acquiring an international mobile subscriber identity from a baseband processor through a preset command;

the application processor in the mobile terminal collecting IMS configuration parameters, and associating a mobile country code and a mobile network code in the international mobile subscriber identity with the IMS configuration parameters;

the application processor in the mobile terminal sending the mobile country code, the mobile network code and the IMS configuration parameters to the baseband processor; and the baseband processor in the mobile terminal receiving the IMS configuration parameters from the application processor, and setting the IMS configuration parameters corresponding to an operator according to the mobile country code and the mobile network code.

Optionally, the preset command is an AT+CIMI command, the international mobile subscriber identity comprises the mobile country code and the mobile network code.

Optionally, the operation of acquiring the international mobile subscriber identity from the baseband processor through the preset command by the application processor in the mobile terminal comprises:

the baseband processor in the mobile terminal reading the international mobile subscriber identity in a SIM card through a modem in advance; and the application processor in the mobile terminal acquiring the mobile country code and the mobile network code in the international mobile subscriber identity through the AT+CIMI command.

Optionally, the step of collecting the IMS configuration parameters, and associating the mobile country code and the mobile network code in the international mobile subscriber identity with the IMS configuration parameters by the application processor in the mobile terminal comprises:

collecting the IMS configuration parameters correspondingly through an MTK platform according to a request of the operator; and associating the mobile country code and the mobile network code in the international mobile subscriber identity of the SIM card with the IMS configuration parameters according to a request of the operator, so that the baseband processor identifies the IMS configuration parameters of the operator.

Optionally, the mobile terminal further comprises: directly modifying the IMS configuration parameters at the application processor to complete a verification test and perform an update when an IMS configuration of the mobile terminal needs to be updated.

A computer readable storage medium stores computer instructions thereon. The steps of the method for configuring the IMS parameters are implemented when the computer instructions are executed by a processor.

The present disclosure provides a method for configuring IMS parameters. The method comprises: an application processor in a mobile terminal acquiring an international mobile subscriber identity from a baseband processor through a preset command; the application processor in the mobile terminal collecting IMS configuration parameters, and associating a mobile country code and a mobile network code in the international mobile subscriber identity with the IMS configuration parameters; the application processor in the mobile terminal sending the mobile country code, the mobile network code and the IMS configuration parameters to the baseband processor; and the baseband processor in the mobile terminal receiving the IMS configuration parameters from the application processor, and setting the IMS configuration parameters corresponding to an operator according to the mobile country code and the mobile network code. IMS parameters of the baseband processor are configured through the application processor according to the present disclosure. When the IMS configuration needs to be updated, there is no need to recompile the code page or wait for the software developer to compile the new version. The parameter configuration is directly modified at the application processor to complete the verification test. The efficiency is improved, and the costs of certification, drive test, and project maintenance of the mobile phone manufacturer are reduced.

DESCRIPTION OF THE EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Figure 1:
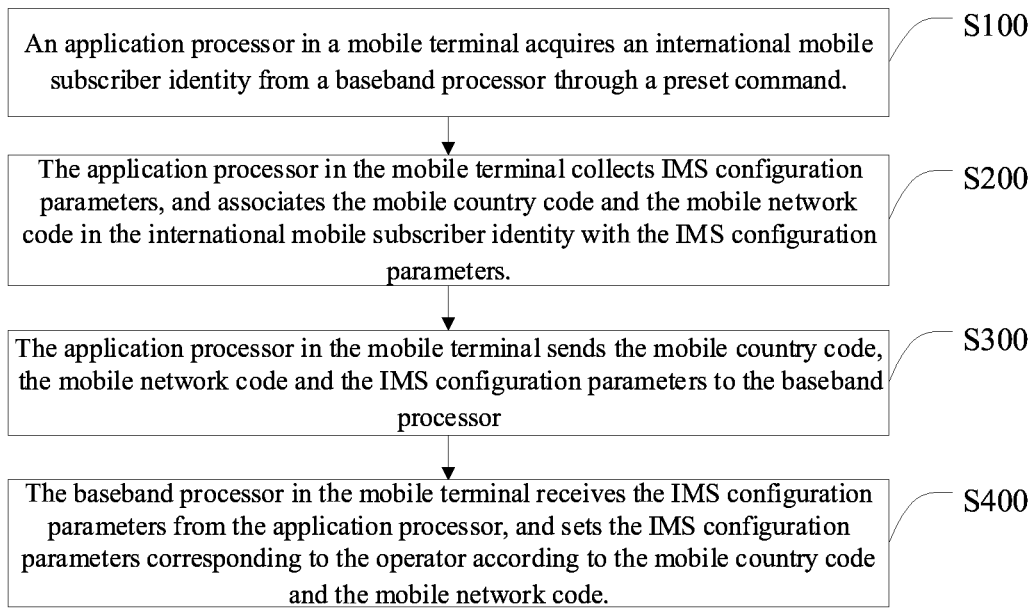
FIG. 1 is a flowchart of a method for configuring IMS parameters according to a preferred embodiment of the present disclosure.

A preferred embodiment of the present disclosure provides a method for configuring IMS parameters. As shown in FIG. 1, the method for configuring the IMS parameters comprises the following steps.

Step S100: an application processor in a mobile terminal acquires an international mobile subscriber identity from a baseband processor through a preset command.

In greater detail, step S100 comprises the steps as follows.

Step S101: the baseband processor in the mobile terminal reads the international mobile subscriber identity in a SIM card through a modem.

Step S102: the application processor in the mobile terminal acquires a mobile country code and a mobile network code in the international mobile subscriber identity through an AT+CIMI command.

In greater detail, the preset command is an AT+CIMI command, and the AT is Attention. The AT instruction set is sent from a terminal equipment (TE) or a data terminal equipment (DTE) to a terminal adapter (TA) or a data circuit terminal equipment (DCE). Functions of a mobile station (MS) are controlled by sending AT instructions through the TA, TE to interact with GSM network services. A subscriber can perform controls, such as call, short message, phone book, data service, fax, etc., through the AT instruction. The IMSI is acquired through the AT+CIMI command. This command is used for reading or identifying the IMSI of the SIM card. The IMSI comprises the mobile country code and the mobile network code.

The mobile country code (MCC) consists of three decimal digits. It indicates the home country of a mobile subscriber (or a system). The coding range is decimal 000-999. The mobile country code is transmitted to be used in the international mobile subscriber identity (IMSI) and the location area identity (LAI), and the location area identity is periodically sent in the system message broadcasted by each cell. The mobile country code (MCC) in the international mobile subscriber identity indicates the country to which the GSMPLMN belongs, and the mobile station treats this received information as one of the important basis for network selection. As the only standard for identifying nations in the world, MCC resources are centrally allocated and managed by the International Telecommunication Union (ITU). Owing to the special significance of the MCC, it is not allowed to be changed once it is set in the network. Mobile network code (MNC), which is used for identifying the mobile communication network to which the mobile subscriber belongs, consists of 2~3 digits. If there are multiple public land mobile networks (PLMNs) in a same country, they can be distinguished through MNCs, that is, each of the PLMNs needs to be assigned unique MNC(s). For example, China Mobile uses 00, 02, 04, 07, China Unicom GSM system uses 01, 06, 09, China Telecom CDMA system uses 03, 05, Telecom 4G uses 11, and China Railcom uses 20.

Step S200: the application processor in the mobile terminal collects IMS configuration parameters, and associates the mobile country code and the mobile network code in the international mobile subscriber identity with the IMS configuration parameters.

In greater detail, step S200 comprises the steps as follows.

Step S201: the IMS configuration parameters are collected correspondingly through an MTK platform according to a request of an operator.

Step S202: the mobile country code and the mobile network code in the international mobile subscriber identity of the SIM card are associated with the IMS configuration parameters according to a request of the operator, so that the baseband processor identifies the IMS configuration parameters of the operator.

If the parameters currently preset by the mobile terminal are inconsistent with the requirements of an operator A, there will be some problems when the subscriber uses the mobile terminal, such as being unable to make a VoLTE phone call, the authentication being unable to pass, etc. Hence, the IMS configuration parameters need to be collected, and then the mobile country code and the mobile network code in the international mobile subscriber identity of the SIM card are associated with the IMS configuration parameters for the baseband processor to identify the IMS configuration parameters of the operator.

Step S300: the application processor in the mobile terminal sends the mobile country code, the mobile network code and the IMS configuration parameters to the baseband processor.

Step S400: the baseband processor in the mobile terminal receives the IMS configuration parameters from the application processor, and sets the IMS configuration parameters corresponding to the operator according to the mobile country code and the mobile network code.

In greater detail, the application processor in the mobile terminal sends the MCC, the MNC and the IMS configuration parameters to the baseband processor. The baseband processor receives the IMS configuration parameters from the application processor. Then, the baseband processor sets the IMS configuration parameters corresponding to the operator according to the MCC and MNC for use when the mobile terminal accesses an IMS network.

Through using the above scheme, the current situation in which time and labor are consumed can be changed. That is, an application software (APP) is provided at the application processor end, the APP can implement an interface for modifying the IMS configuration parameters, and a network tester configures the IMS parameters through the interface. Then, the application processor transmits the IMS parameters to the baseband processor. After that, the baseband processor end performs configuration according to the parameters transmitted by the application processor. In this manner, the terminal can adjust the IMS configuration in real time.

Figure 2:
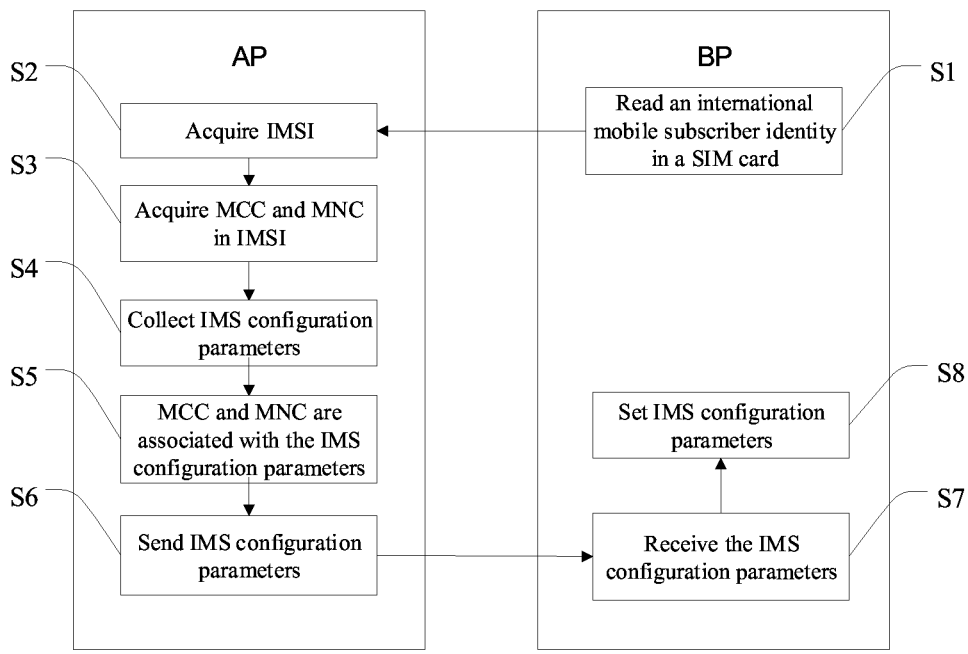
FIG. 2 is a schematic diagram of connection relationships between an application processor and a baseband processor in a method for configuring IMS parameters according to a preferred embodiment the present invention.

As shown in FIG. 2, FIG. 2 is a schematic diagram of connection relationships between an application processor and a baseband processor in a method for configuring IMS parameters according to a preferred embodiment the present invention. A control flow for a mobile terminal to implement the method for configuring the IMS parameters is as follows:

S1: the baseband processor reads an international mobile subscriber identity in a SIM card through a modem in advance;

S2: the application processor acquires the international mobile subscriber identity (IMSI) through an AT+CIMI command;

S3: the international mobile subscriber identity comprises a mobile country code and a mobile network code. The application processor directly extracts the mobile country code and the mobile network code;

S4: the IMS configuration parameters are collected correspondingly through an MTK platform according to a request of an operator;

S5: the mobile country code and the mobile network code in the international mobile subscriber identity of the SIM card are associated with the IMS configuration parameters according to a request of the operator, so that the baseband processor identifies the IMS configuration parameters of the operator;

S6: the application processor in the mobile terminal sends the mobile country code, the mobile network code and the IMS configuration parameters to the baseband processor;

S7: the baseband processor in the mobile terminal receives the IMS configuration parameters from the application processor;

S8: the baseband processor in the mobile terminal sets the IMS configuration parameters corresponding to the operator according to the mobile country code and the mobile network code.

The main objective of the present disclosure is to put the IMS configuration parameters currently at the baseband processor end to the application processor end. The IMS configuration parameters at the baseband processor end cannot be modified by the network tester, the subscriber, or the like after the mobile terminal leaves the factory. However, putting them at the application processor end can allow the network tester, the subscriber, or the like to reconfigure the IMS configuration parameters without re-flashing the software. The effects thus caused are as follows:

1. Software developers don't need to recompile code(s) when the IMS configuration needs to be updated;

2. Network testers don't have to wait for software developers to compile new versions when the IMS configuration needs to be updated, and can directly modify the parameter configuration at the application processor end to complete the verification tests. The efficiency is improved, and the costs of certification, drive test, and project maintenance of the mobile phone manufacturer are reduced.

Figure 3:
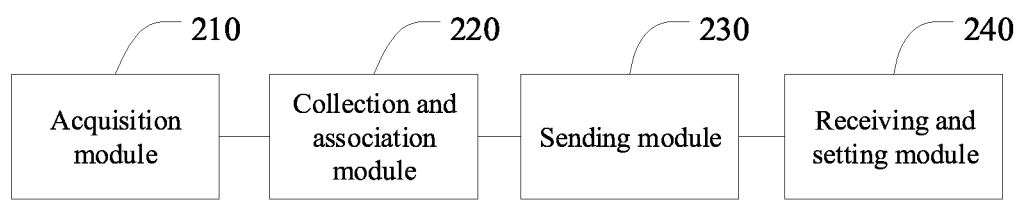
FIG. 3 is a block diagram showing a functional principle of an IMS parameter configuration system according to a preferred embodiment of the present disclosure.

The present disclosure further provides an IMS parameter configuration system. As shown in FIG. 3, the IMS parameter configuration system comprises a processor and a memory communicatively connected to the processor. The memory stores a computer program, and the computer program is configured to be executed by the processor. The computer program comprises:

An acquisition module 210 configured to cause an application processor in a mobile terminal to acquire an international mobile subscriber identity from a baseband processor through a preset command (the detailed description is as mentioned previously);

A collection and association module 220 configured to cause the application processor in the mobile terminal to collect IMS configuration parameters, and associate a mobile country code and a mobile network code in the international mobile subscriber identity with the IMS configuration parameters (the detailed description is as mentioned previously);

A sending module 230 configured to cause the application processor in the mobile terminal to send the mobile country code, the mobile network code and the IMS configuration parameters to the baseband processor (the detailed description is as mentioned previously);

A receiving and setting module 240 configured to cause the baseband processor in the mobile terminal to receive the IMS configuration parameters from the application processor, and set the IMS configuration parameters corresponding to an operator according to the mobile country code and the mobile network code (the detailed description is as mentioned previously).

In greater detail, the preset command is an AT+CIMI command. The international mobile subscriber identity comprises the mobile country code and the mobile network code. The detailed description is as mentioned previously.

In the IMS parameter configuration system, the acquisition module 210 comprises:

A reading unit configured to cause the baseband processor in the mobile terminal to read the international mobile subscriber identity in a SIM card through a modem in advance (the detailed description is as mentioned previously);

A command acquisition unit configured to cause the application processor in the mobile terminal to acquire the mobile country code and the mobile network code in the international mobile subscriber identity through the AT+CIMI command (the detailed description is as mentioned previously).

The collection and association module 220 comprises:

A collection unit configured to cause the IMS configuration parameters to be collected correspondingly through an MTK platform according to a request of the operator (the detailed description is as mentioned previously);

An association unit configured to cause the mobile country code and the mobile network code in the international mobile subscriber identity of the SIM card to be associated with the IMS configuration parameters according to a request of the operator, so that the baseband processor identifies the IMS configuration parameters of the operator (the detailed description is as mentioned previously).

In greater detail, when the IMS configuration of the mobile terminal needs to be updated, the IMS configuration parameters can be directly modify at the application processor to complete a verification test and perform an update.

Figure 4:
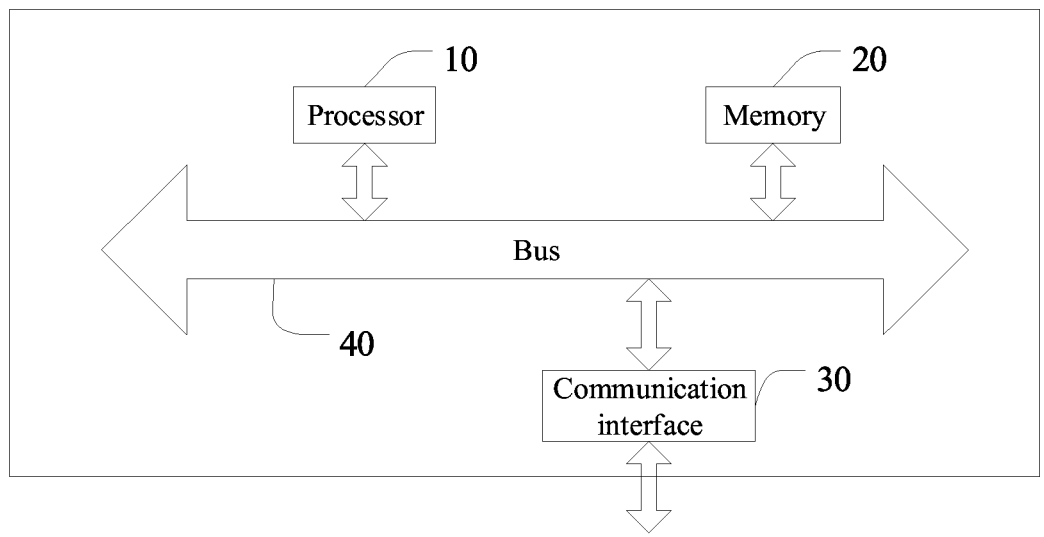
FIG. 4 is a structural block diagram of a mobile terminal according to the present disclosure.

FIG. 4 is a structural block diagram of a mobile terminal according to the present disclosure. As shown in FIG. 4, the mobile terminal comprises a processor 10, a memory 20, a communication interface 30 and a bus 40.

The processor 10, the memory 20, and the communication interface 30 complete communications with one another through the bus 40.

The communication interface 30 is configured for information transmission between communication devices of the mobile terminals.

The processor 10 is configured to call a computer program in the memory 20 to execute the method provided by the above various method embodiments, which includes, for example: the application processor in the mobile terminal acquiring the international mobile subscriber identity from the baseband processor through the preset command; the application processor in the mobile terminal collecting the IMS configuration parameters, and associating the mobile country code and the mobile network code in the international mobile subscriber identity with the IMS configuration parameters; the application processor in the mobile terminal sending the mobile country code, the mobile network code and the IMS configuration parameters to the baseband processor; the baseband processor in the mobile terminal receiving the IMS configuration parameters from the application processor, and setting the IMS configuration parameters corresponding to the operator according to the mobile country code and the mobile network code.

The present disclosure also proposes a mobile terminal. The mobile terminal comprises a processor and a memory communicatively connected to the processor. The memory is configured to store instructions and data.

The processor is configured to execute an application processor in a mobile terminal acquiring an international mobile subscriber identity from a baseband processor through a preset command;

the application processor in the mobile terminal collecting IMS configuration parameters, and associating a mobile country code and a mobile network code in the international mobile subscriber identity with the IMS configuration parameters;

the application processor in the mobile terminal sending the mobile country code, the mobile network code and the IMS configuration parameters to the baseband processor; and the baseband processor in the mobile terminal receiving the IMS configuration parameters from the application processor, and setting the IMS configuration parameters corresponding to an operator according to the mobile country code and the mobile network code.

Optionally, the preset command is an AT+CIMI command, the international mobile subscriber identity comprises the mobile country code and the mobile network code.

Optionally, the operation of acquiring the international mobile subscriber identity from the baseband processor through the preset command by the application processor in the mobile terminal comprises:

the baseband processor in the mobile terminal reading the international mobile subscriber identity in a SIM card through a modem in advance; and the application processor in the mobile terminal acquiring the mobile country code and the mobile network code in the international mobile subscriber identity through the AT+CIMI command.

Optionally, the step of collecting the IMS configuration parameters, and associating the mobile country code and the mobile network code in the international mobile subscriber identity with the IMS configuration parameters by the application processor in the mobile terminal comprises:

collecting the IMS configuration parameters correspondingly through an MTK platform according to a request of the operator; and associating the mobile country code and the mobile network code in the international mobile subscriber identity of the SIM card with the IMS configuration parameters according to a request of the operator, so that the baseband processor identifies the IMS configuration parameters of the operator.

Optionally, the mobile terminal further comprises: directly modifying the IMS configuration parameters at the application processor to complete a verification test and perform an update when an IMS configuration of the mobile terminal needs to be updated.

The present disclosure also proposes a computer readable storage medium stores computer instructions thereon. The steps of the method for configuring the IMS parameters are implemented when the computer instructions are executed by a processor.

The present disclosure provides a method, a system, a mobile terminal, and a computer readable storage medium for configuring IMS parameters. The method comprises: an application processor in a mobile terminal acquiring an international mobile subscriber identity from a baseband processor through a preset command; the application processor in the mobile terminal collecting IMS configuration parameters, and associating a mobile country code and a mobile network code in the international mobile subscriber identity with the IMS configuration parameters; the application processor in the mobile terminal sending the mobile country code, the mobile network code and the IMS configuration parameters to the baseband processor; and the baseband processor in the mobile terminal receiving the IMS configuration parameters from the application processor, and setting the IMS configuration parameters corresponding to an operator according to the mobile country code and the mobile network code. IMS parameters of the baseband processor are configured through the application processor according to the present disclosure. When the IMS configuration needs to be updated, there is no need to recompile the code page or wait for the software developer to compile the new version. The parameter configuration is directly modified at the application processor to complete the verification test. The efficiency is improved, and the costs of certification, drive test, and project maintenance of the mobile phone manufacturer are reduced.

It will be understood by those of ordinary skill in the art that all or part of the blocks for implementing the method of the embodiments described above may be accomplished by a program that commands the relevant hardware, e.g. a processor or a controller. The program may be stored in a computer readable storage medium, e.g. a memory, a disk or a compact disc. When the program is executed, one of the blocks of the method embodiment or a combination thereof may be included.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method for configuring IP multimedia subsystem (IMS) parameters comprising:
   an application processor in a mobile terminal acquiring an international mobile subscriber identity from a baseband processor through a preset command;
   the application processor in the mobile terminal collecting IMS configuration parameters, and associating a mobile country code and a mobile network code in the international mobile subscriber identity with the IMS configuration parameters;
   the application processor in the mobile terminal sending the mobile country code, the mobile network code and the IMS configuration parameters to the baseband processor; and
   the baseband processor in the mobile terminal receiving the IMS configuration parameters from the application processor, and setting the IMS configuration parameters corresponding to an operator according to the mobile country code and the mobile network code.

2. The method as claimed in claim 1, wherein the preset command is an AT+CIMI command, the international mobile subscriber identity comprises the mobile country code and the mobile network code.

3. The method as claimed in claim 2, wherein the step of acquiring the international mobile subscriber identity from the baseband processor through the preset command by the application processor in the mobile terminal comprises:
   the baseband processor in the mobile terminal reading the international mobile subscriber identity in a SIM card through a modem in advance; and
   the application processor in the mobile terminal acquiring the mobile country code and the mobile network code in the international mobile subscriber identity through the AT+CIMI command.

4. The method as claimed in claim 3, wherein the step of collecting the IMS configuration parameters, and associating the mobile country code and the mobile network code in the international mobile subscriber identity with the IMS configuration parameters by the application processor in the mobile terminal comprises:
   collecting the IMS configuration parameters correspondingly through an MTK platform according to a request of the operator; and
   associating the mobile country code and the mobile network code in the international mobile subscriber identity of the SIM card with the IMS configuration parameters according to a request of the operator, so that the baseband processor identifies the IMS configuration parameters of the operator.

5. The method as claimed in claim 1, further comprising:
   directly modifying the IMS configuration parameters at the application processor to complete a verification test and perform an update when the IMS configuration of the mobile terminal needs to be updated.

6. An IP multimedia subsystem (IMS) parameter configuration system comprising a processor and a memory communicatively connected to the processor, the memory storing a computer program executable by the processor, the computer program comprising:
   an acquisition module configured to cause an application processor in a mobile terminal to acquire an international mobile subscriber identity from a baseband processor through a preset command;
   a collection and association module configured to cause the application processor in the mobile terminal to collect IMS configuration parameters, and associate a mobile country code and a mobile network code in the international mobile subscriber identity with the IMS configuration parameters;
   a sending module configured to cause the application processor in the mobile terminal to send the mobile country code, the mobile network code and the IMS configuration parameters to the baseband processor; and
   a receiving and setting module configured to cause the baseband processor in the mobile terminal to receive the IMS configuration parameters from the application processor, and set the IMS configuration parameters corresponding to an operator according to the mobile country code and the mobile network code.

7. The IP IMS parameter configuration system as claimed in claim 6, wherein the acquisition module comprises:
   a reading unit configured to cause the baseband processor in the mobile terminal to read the international mobile subscriber identity in a SIM card through a modem in advance; and
   a command acquisition unit configured to cause the application processor in the mobile terminal to acquire the mobile country code and the mobile network code in the international mobile subscriber identity through an AT+CIMI command.

8. The IP IMS parameter configuration system as claimed in claim 7, wherein the collection and association module comprises:
   a collection unit configured to cause the IMS configuration parameters to be collected correspondingly through an MTK platform according to a request of the operator; and
   an association unit configured to cause the mobile country code and the mobile network code in the international mobile subscriber identity of the SIM card to be associated with the IMS configuration parameters according to a request of the operator, so that the baseband processor identifies the IMS configuration parameters of the operator.

9. A mobile terminal comprising an application processor, a baseband processor, and a memory communicatively connected to the application processor and the baseband processor, the memory being configured to store data and instructions executable by the application processor and the baseband processor to perform operations of:
   acquiring, with the application processor in the mobile terminal, an international mobile subscriber identity from the baseband processor through a preset command;
   collecting, with the application processor in the mobile terminal, IMS configuration parameters, and associating a mobile country code and a mobile network code in the international mobile subscriber identity with the IMS configuration parameters;
   the processor of the mobile terminal sending the mobile country code, the mobile network code and the IMS configuration parameters to the baseband processor; and
   the baseband processor of the mobile terminal receiving the IMS configuration parameters from the application processor, and setting the IMS configuration parameters corresponding to an operator according to the mobile country code and the mobile network code.

10. The mobile terminal as claimed in claim 9, wherein the preset command is an AT+CIMI command, the international mobile subscriber identity comprises the mobile country code and the mobile network code.

11. The mobile terminal as claimed in claim 10, wherein the operation of acquiring, with the application processor in the mobile terminal, the international mobile subscriber identity from the baseband processor through the preset command comprises:
    the baseband processor in the mobile terminal reading the international mobile subscriber identity in a SIM card through a modem in advance; and
    the application processor in the mobile terminal acquiring the mobile country code and the mobile network code in the international mobile subscriber identity through the AT+CIMI command.

12. The mobile terminal as claimed in claim 11, wherein the operation of collecting the IMS configuration parameters, and associating the mobile country code and the mobile network code in the international mobile subscriber identity with the IMS configuration parameters by the application processor in the mobile terminal comprises:
    collecting the IMS configuration parameters correspondingly through an MTK platform according to a request of the operator; and
    associating the mobile country code and the mobile network code in the international mobile subscriber identity of the SIM card with the IMS configuration parameters according to a request of the operator, so that the baseband processor identifies the IMS configuration parameters of the operator.

13. The mobile terminal as claimed in claim 9, further comprising:
    directly modifying the IMS configuration parameters at the application processor to complete a verification test and perform an update when the IMS configuration of the mobile terminal needs to be updated.

* * * * *